Sept. 8, 1959
R. H. COTHER
2,903,633
ADJUSTABLE ADMITTANCE UNIT
Filed Feb. 6, 1957
3 Sheets-Sheet 1
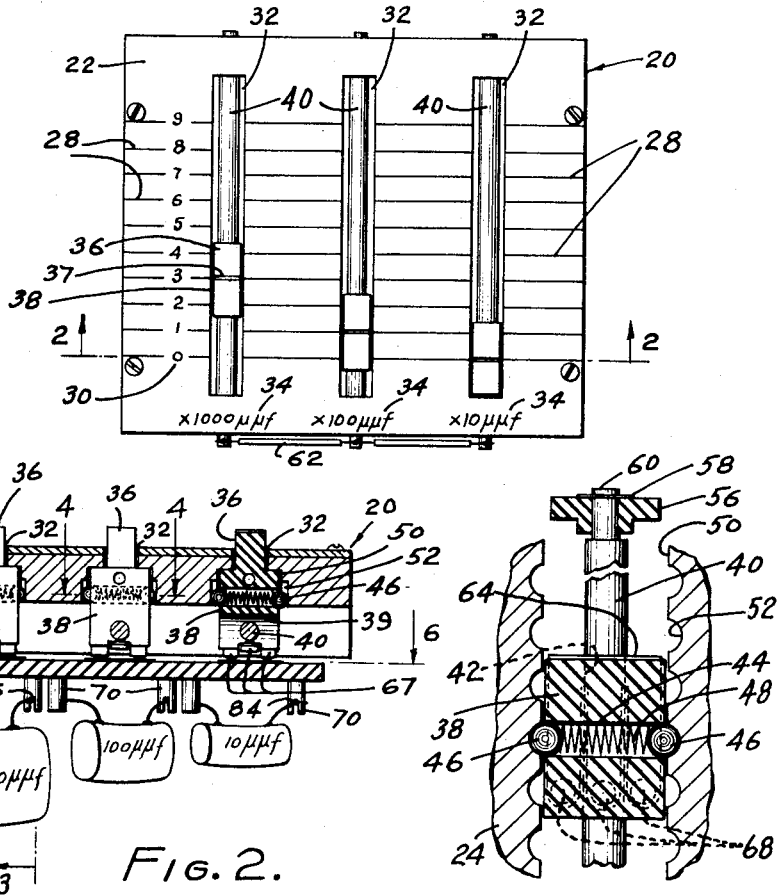
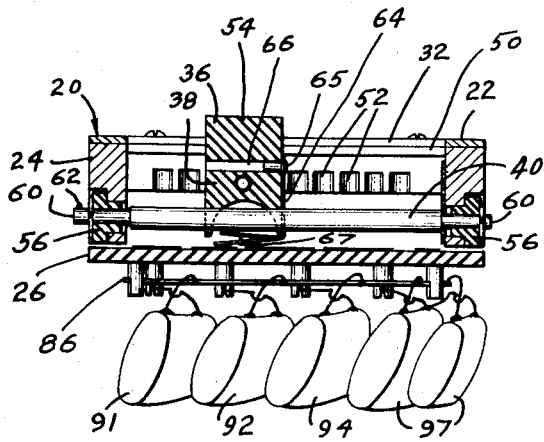
INVENTOR.
ROBERT H. COTHER
BY
ATTORNEY

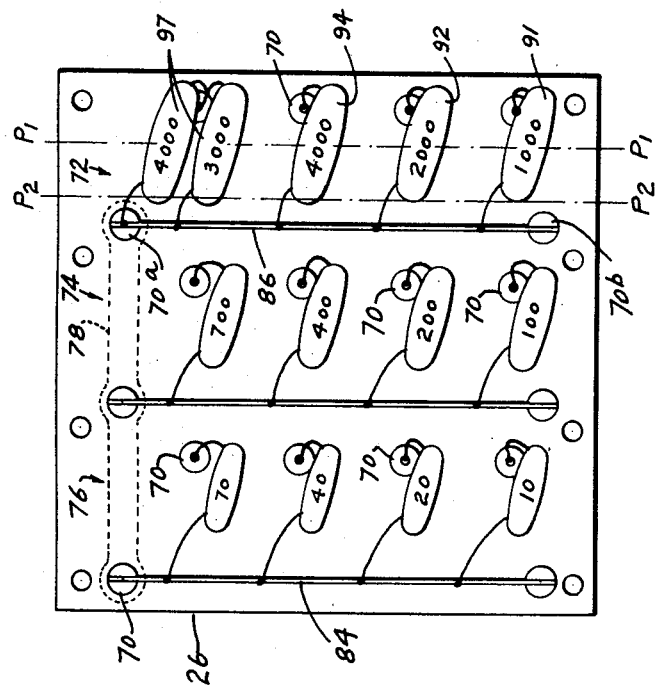
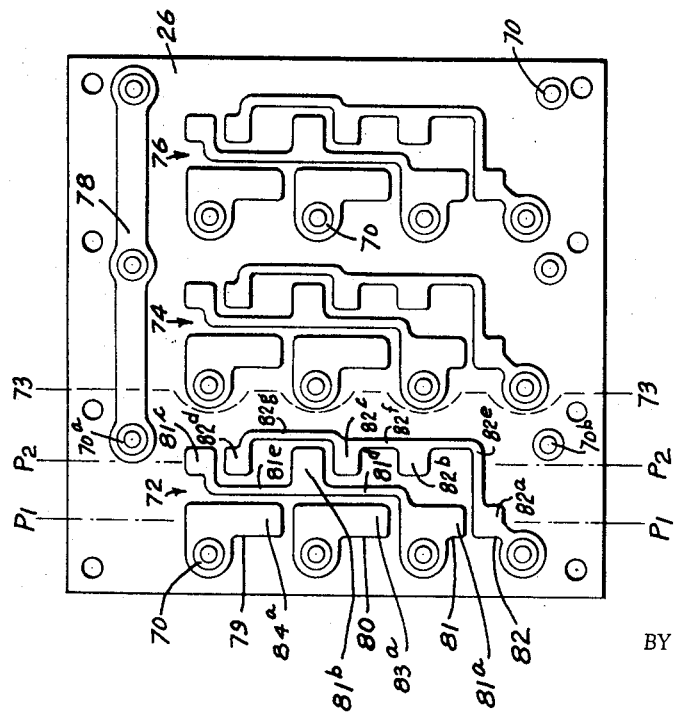

Sept. 8, 1959                R. H. COTHER                2,903,633
                        ADJUSTABLE ADMITTANCE UNIT
Filed Feb. 6, 1957                                    3 Sheets-Sheet 3

INVENTOR.
ROBERT H. COTHER
BY
ATTORNEY

United States Patent Office 2,903,633
Patented Sept. 8, 1959

2,903,633

ADJUSTABLE ADMITTANCE UNIT

Robert H. Cother, Fullerton, Calif., assignor, by mesne assignments, to Endevco Corporation, Pasadena, Calif., a corporation of California Application February 6, 1957, Serial No. 638,551

7 Claims. (Cl. 317—249)

This invention relates generally to electrical control devices and more particularly to an improved multiple-valued admittance unit, and especially to an improved selector switch for use in such a unit.

In all cases in this application, a variable admittance selector comprises my improved selector switch, together with appropriate admittance elements connected thereto for providing a series of admittance element values (capacitance values, conductance values, or reciprocal-inductance values) which are proportional to the integrals 0, 1, 2, 3, 4, 5, 6, 7, 8, 9. For this reason, the entire unit comprising the selector switch and the admittance elements, is referred to as a variable admittance unit.

Previously, many switching arrangements have been provided for combining capacitance admittance elements to produce integral capacitance values from 0 to 10. Usually, the total capacitance of the capacitors has been maintained at a minimum. Two ways of doing this have been to employ capacitors which have 1, 2, 3, and 4 units of capacitance, or 1, 1, 3, and 5 units of capacitance. In both cases the total value of capacitance is 10. However, in order to combine these capacitors in various ways to produce any number of integral values of capacitance from, say, 0 to 10, it is sometimes necessary to connect more than two of the capacitors in parallel. For example, to produce 8 units of capacitance with the first arrangement, it is necessary to connect the 1-, 3-, and 4-unit capacitance elements in parallel; with the second it is necessary only to connect the 3- and 5-unit admittances in parallel. But to produce 9 or 10 units of capacitance, three or four capacitors must be connected in parallel in both cases. A similar arrangement would be required if another type of admittance element were employed.

When an attempt is made to provide a switch of the printed circuit type for accomplishing this result, the printed conductors themselves lie on the surface, and if it is necessary to connect more than two of the admittance elements at a time in parallel, then, in many instances at least, the conductive elements (connectors) on the surface must cross each other, thus necessitating puncturing the base and placing part of the connector on the under-surface or otherwise providing for cross-over.

In a particular embodiment of the invention, which is illustrated in the drawings and described in detail hereinafter, the application of the invention to a decade capacitor is specifically considered. As will become apparent, the invention comprises an improved selector switch. When capacitors of particular values are connected to the selector switch in specific ways, a capacitance having any predetermined integral value over a decade range may be readily selected by manipulation of the switch. Though the invention is particularly described as applicable to a decade capacitor, it will be understood that it is also applicable to a system in which a series of integral values of conductances are provided or to a system in which a series of integral values of reciprocal henries are provided. For want of a better term, the expression "admittance element" is sometimes applied hereinafter to a capacitor element, to a resistor element when considered as a conductance, and to an inductor element when its reciprocal-henry value is considered. When such term is so used, it is to be borne in mind that an admittance element of capacitor type is measured in microfarads or some other basic unit proportional thereto; an admittance element of the resistor type is measured in terms of reciprocal ohms, or mhos, or some unit proportional thereto; and an admittance element of the inductor type is measured in reciprocal millihenries or other unit proportional thereto.

One object of my invention is to provide an adjustable admittance unit of the decade-type which requires no more than two admittance units to be connected together at any one time.

Another object of my invention is to provide an adjustable admittance unit of the decade-type which employs a switch plate that employs contacts and contact connectors printed on only one surface of the plate.

Another object of my invention is to provide a small, compact, precision variable admittance unit of the decade-type.

A further object of my invention is to provide a compact variable admittance unit utilizing a minimum number of small precision admittance elements to provide a step-by-step sequence of admittance values from 0 to 9 units with a simple and novel circuitry based on the use of printed circuits and sliding contacts.

A still further object of my invention is to provide a compact variable admittance unit utilizing sliding contacts which are capable of retaining their settings under all ordinary operating conditions.

Further objects, advantages, and improvements over the prior art of my invention will be disclosed in the following description in conjunction with the accompanying drawings, wherein like reference characters denote like parts throughout the several views, and wherein:

Figure 1 is a plan view of my admittance unit;

Fig. 2 is an elevation in cross-section taken on the line 2—2 of Fig. 1;

Fig. 3 is another elevation in cross-section taken on the line 3—3 of Fig. 2;

Fig. 4 is a detailed sectional illustration of one of the elements of my invention taken on the line 4—4 of Fig. 2;

Fig. 5 is another detail shown in perspective;

Fig. 6 is a plan view of one printed circuit layout used in my invention;

Fig. 7 is a bottom plan view of the admittance unit;

Figure 8:
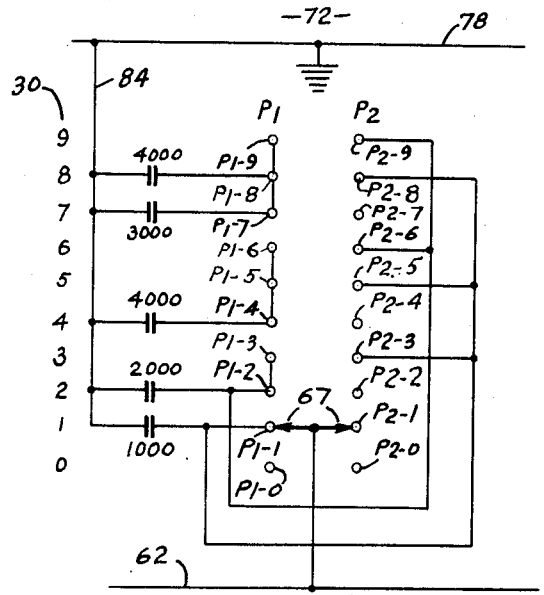
Fig. 8 is a schematic wiring diagram of one section of the printed circuit layout shown in Fig. 6.

In Figs. 1 to 3, there is shown a decade admittance unit 20 comprising an indicator plate 22, a base unit 24, and a printed-circuit contact plate 26. This particular admittance unit also comprises capacitors as admittance elements, thus providing a decade capacitor. The indicator plate 22, which may be made of metal, plastic, or other suitable material, is suitably engraved with ten indicator lines 28, and a column of digits 30, reading upwardly from 0 to 9 inclusive. These digits are positioned at the left ends of the respective indicator lines. Thus the digits indicate a series of relative capacitances, or other admittance element values, as will be described more fully hereinafter. In assembly, plate 22 may be secured to base unit 24 by screws, as shown, or by other suitable fasteners.

Three slots 32, which are machined through the indicator plate, serve as guides for push bars or knobs in the form of projections 36 of contact blocks or bridging connectors 38. The projections extend upwardly through the indicator plate 22 sufficiently far to permit the blocks to be moved manually in the slots to positions opposite the respective digits 30. Indicator lines 37 formed in the outer surfaces of the projecting handles 36 are employed to indicate the positions of the contact blocks 38 in the admittance unit 20.

Indicia 34 of the values of the admittance elements used in my admittance unit are engraved at the feet of the slots 32. When using the set of capacitors described hereinafter, the values of the capacitances established by the three switch blocks are multiples of 1000 $\mu\mu$f., 100 $\mu\mu$f., and 10 $\mu\mu$f., as indicated by the indicia $\times$1000 $\mu\mu$f., $\times$100 $\mu\mu$f., and $\times$10 $\mu\mu$f., at the bottoms of the respective slots. With the bars 38 located as shown in Fig. 1, the capacitance value is $$3 \times 1000\ \mu\mu f. + 1 \times 100\ \mu\mu f. + 0 \times 10\ \mu\mu f.\ \text{or}\ 3100\ \mu\mu f.$$

As will appear hereinafter, other values of admittance elements could be established in terms of mhos or in terms of reciprocal millihenries.

Base unit 24 comprises the contact-carrying or movable switching portion of my admittance unit. Contact blocks or bridging connectors 38 slide on conductor rods 40, which rods are located, in assembly of the unit, directly under the slots 32. The contact blocks 38 are made of plastic or other suitable insulating material. Each block is provided with a central bore 42 adapted to slidingly accept the corresponding conductor rod 40. A cross-bore 44, normal to the central bore 42 and displaced therefrom, is provided in each contact block to receive two detent balls 46 and a compression spring 48.

Base unit 24, which may be a machined casting, is formed of metal, plastic, or other suitable material, and is provided with three serrated slots 50 adapted to slidingly accept the contact blocks 38. Serrations or pockets 52 are provided on the sides of each base slot 50 to coact with the detent balls 46 and spring 48 carried by each contact block so as to temporarily arrest the contact block in its traverse of the conductor rod, and to register the indicator lines 37 on the bars 36 in alignment with the indicator lines 28 on the indicator plate 22. It will be understood that the axis of the cross-bore 44, the axis of the two serrations 52 engaged by the detent balls 46, the indicator line 37 on each contact block 38, and the indicator line, such as the line marked 3 for example as shown in Fig. 1, all lie in a single plane. Thus, when the contact block is moved on the conductor rod 40 and the detent balls 46 engage a pair of serrations 52, the indicator line 37 on the projections 36 of the contact blocks 38 will line up with one of the numbered indicator lines 28 on the indicator plate 22. In Fig. 1, the three bars 36 are shown with their respective indicator lines 37 registered with the indicator lines on the plate 22 corresponding to the digits 3, 1, and 0, respectively, thus indicating the total capacitance value of 3100 $\mu\mu$f.

Conductor rods 40 are centrally supported in slots 50 in base unit 24 by means of insulating bushings 56 and lock washers 58 which fit into grooves machined into the reduced diameter ends 60 of the conductor rods 40. Ends of these conductor rods are electrically connected by soldering a bus 62 thereto, as shown in Fig. 1. As will be noted from Fig. 8, an external connection is made to this conductor rod bus 62.

As previously mentioned, contact blocks 38 slide on the conductor rods 40. A metallic clip 64 is attached to each contact block 38 by means of a rivet 65 which is inserted into the small bore 66 which is formed parallel to main bore 42. The clip is trifurcated to form three contact-bearing fingers 67. These contact fingers in turn are provided with contacts 68, which are made of tungsten or other suitable wear-resistant, non-corrosive, contact material. As indicated in Fig. 3, the central contact 68 rides on and makes electrical contact with the conductor rod 40. The other two outside contacts ride on the printed circuit plate 26 and make selective contact with parts of the circuitry printed thereon, as is more fully explained hereinafter. Contact block 38 is provided with a recess 39 whose principal axis is perpendicular to central bore 42. This recess is provided so that central contact finger 67 can make electrical contact with conductor rod 40.

While the conductor rod 40 has been described as being metallic and electrically conductive, it should be understood that the rod could be made of insulating material and that in such a case flexible electrical connectors could be used between the clips 64 and the bus 62. In such a case, the central finger 67 and contact 68 are omitted.

Printed circuit contact plate 26, as shown in Figs. 6 and 7, carries a plurality of printed circuits on one side and a plurality of connection studs 70 that project from that side through the plate to the other side. The printed circuits comprise three similar groups 72, 74, and 76 of contacts and conductors and a printed bus bar 78. Since all three groups are similar, the structure and function of but one group are explained in detail. The two bus bars 62 and 78 form terminals for the unit 20, as indicated in Fig. 8.

Group 72, to the left of the dotted line 73 in Fig. 6, comprises six connection studs 70 and four printed circuit strips 79, 80, 81, and 82 that provide switch contacts and conductive connectors between selected contacts. Contact-conductive strip 81 comprises contacts 81a, 81b, and 81c, and connecting strips 81d and 81e. Contact-conductive strip 82 comprises contacts 82a, 82b, 82c, and 82d, and connecting strips 82e, 82f, and 82g. Contact-conductive strip 80 comprises a contact 83a, and contact-conductive strip 79 comprises a contact 84a. It will be here noted that printed circuit contacts 79, 80, 81a, 82a, 83a, and 84a lie on one path P1, and contacts 81c, 82d, 81b, 82c, and 82b lie on another path P2 along which the switch contacts 68 move.

The two right-hand connection studs 70a and 70b are connected together on the bottom side of plate 26 by a bus bar 86, as shown in Fig. 7. This bus bar 86 serves as a common connection for the admittance elements or capacitors 91, 92, 94, and 97 used in group 72. The four capacitors are respectively connected between the bus bar 86 and the four connection studs 70 that are electrically connected to the respective contact-conductive strips 79, 80, 81, and 82. It should be noted that the right-hand group of capacitors shown in Fig. 7 are connected to the left-hand group 72 of printed circuit contacts and conductive strips shown in Fig. 6.

With reference to Figs. 6, 7, and 8, the following table will correlate the connections between the three figures:

*Table A*

| Element | Capacitance, $\mu\mu$f. | Printed circuit strip | Contacts (Fig. 6) | Position of contacts (Fig. 8) |
|---|---|---|---|---|
| 91 | 1,000 | 82 | 82a<br>82b<br>82c<br>82d | P1-1<br>P2-3<br>P2-5<br>P2-8 |
| 92 | 2,000 | 81 | 81a<br>81b<br>81c | P1-2<br>P2-3<br>P2-6<br>P2-9 |
| 94 | 4,000 | 80 | 83a | P1-4<br>P1-5<br>P1-6<br>P1-7 |
| 97 | 7,000 | 79 | 84a | P1-8<br>P1-9 |

In Table A, the numbers that identify the capacitor elements are shown in the first column. The capacitance values of the respective capacitors are shown in the second column. As previously explained, one end of each of the capacitors is connected to the common bus wire 84 which in turn is connected to terminal bus 78. The other ends of the capacitors are connected to the respective connector studs 70, as shown in Fig. 7, thus establishing connection with certain printed circuit strips. The strips to which the respective capacitors are connected are shown in the third column of the table. Each of the strips thus connects each of the capacitors to certain contacts. The particular contacts to which a capacitor element is thus connected are enumerated in the fourth column. The positions at which the contacts are located are indicated in the fifth column. In the latter column, the positions of the contacts are identified by coordinates X and Y, where X indicates the path (P1 or P2) on which the contact is located and in which Y indicates the digit number of the indicator line 28 (see Fig. 1) opposite which the contact is located. Thus, for example, a contact located at position P2-3 is located on path P2 opposite the reference line 28 of Fig. 1 which is identified by the digit 3.

Thus, as indicated by Table A, the 1000 $\mu\mu f.$, or "1-unit," capacitor 91 is connected by the printed circuit strip 82 to contacts 82a, 82b, 82c, and 82d, which are located respectively at positions P1-1, P2-3, P2-5, and P2-8.

Similarly, the 2000 $\mu\mu f.$, or "2-unit," capacitor 92 is connected by the printed circuit strip 81 to contact 81a, which is located in part at position P1-2 and position P2-3, and also to contacts 81b and 81c, which are located respectively at positions P2-6 and P2-9. Likewise, the 4000 $\mu\mu f.$, or "4-unit," capacitor 94 is connected by the printed circuit strip 80 to contact 83a, which is located in part at positions P1-4, P1-5, and P1-6. And, likewise, the 7000 $\mu\mu f.$, or "7-unit," capacitor 97 is connected by the printed circuit strip 79 to contact 84a, which is located in part at positions P1-7, P1-8, and P1-9.

It will be appreciated that metal clip 64 with its contact fingers 67 and contacts 68 constitutes a bridging connector for switching the various capacitors into and out of connection with the terminal buses 62 and 78. When the switch block is in one of its indicated positions, the clip 64 is in contact with the contact plate at the two corresponding positions on the two paths P1 and P2.

The values of the capacitors that are connected to the contacts 68 when located at the various contact positions are indicated in Table B.

Table B

| Contact position | Element value | Contact position | Element value | Total value |
| --- | --- | --- | --- | --- |
| P1-0 | 0 | P2-0 | 0 | 0 |
| P1-1 | 1 | P2-1 | 0 | 1 |
| P1-2 | 2 | P2-2 | 0 | 2 |
| P1-3 | 2 | P2-3 | 1 | 3 |
| P1-4 | 4 | P2-4 | 0 | 4 |
| P1-5 | 4 | P2-5 | 1 | 5 |
| P1-6 | 4 | P2-6 | 2 | 6 |
| P1-7 | 7 | P2-7 | 0 | 7 |
| P1-8 | 7 | P2-8 | 1 | 8 |
| P1-9 | 7 | P2-9 | 2 | 9 |

In this table, column 1 identifies the contact positions of the contacts that are located on path P1, while column 2 indicates the relative value of the elements connected to those respective contacts. The positions of the contacts located on path P2 are identified in column 3, while the values of the capacitances connected to those contacts are indicated respectively in column 4. The total values of capacitance provided when corresponding contacts on the two paths are interconnected by the action of the clip 64 and its contact fingers 67 are indicated in the fifth column of this table.

The element values and the total value are expressed as integers, that is, as integral values of the base unit. In the case of the decade switch arrangement described above, the base units for the three switches are 1000 $\mu\mu f.$, 100 $\mu\mu f.$, and 10 $\mu\mu f.$, respectively.

Table B clearly illustrates that while all but one of the contact positions in path P1 are connected to one of the capacitors, five contact positions on path P2, namely positions 0, 1, 2, 4, and 7, are not connected to any admittance element. No contact is provided on the printed circuit contact plate at positions P1-0, P2-0, P2-1, P2-2, P2-4, or P2-7.

When the indicator line 54 on the projection 36 of the contact block 38 is lined up with the "0" line on the indicator plate 22, the admittance is zero (that is, the impedance is infinite), as no capacitor is connected to either position P1-0, P2-0. When the indicator 54 is at line "1," the conductor rod 40 is connected to the 1000 $\mu\mu f.$ capacitor through the contact at position P1-1, there being no contact at position P2-1. When the contact block 38 is at line "3," as shown in Fig. 8, a total of 3000 $\mu\mu f.$ is in circuit, since the 1000 $\mu\mu f.$ capacitor is connected to the contact at position P2-3 and the 2000 $\mu\mu f.$ capacitor is connected to the contact at position P1-3, the two capacitors being connected in parallel and their values being added. In a similar way, when the contact block is at line "4," the 4000 $\mu\mu f.$ capacitor is connected. When the contact block is at line "5," the 4000 $\mu\mu f.$ and the 1000 $\mu\mu f.$ capacitors are connected in parallel. When the contact block is at line "6," the 4000 $\mu\mu f.$ and the 2000 $\mu\mu f.$ capacitors are connected in parallel. When the contact block is at line "7," the 7000 $\mu\mu f.$ capacitor is connected. When the contact block is at line "8," the 7000 $\mu\mu f.$ and the 1000 $\mu\mu f.$ capacitors are connected in parallel. When the contact block is at line "9," the 7000 $\mu\mu f.$ and the 2000 $\mu\mu f.$ capacitors are connected in parallel.

In all cases, the total capacitance appears by connection of either none or one or two capacitors between the bus 62 at the side of the decade capacitor and the bus 78 which is printed on the contact plate 26. It is thus seen that for each switch block position, as indicated by the digits 30 on the indicator plate 28, a predetermined number of capacitors, not exceeding two in number, are introduced across the terminals of the decade capacitor, thus establishing a decade sequence of capacitor values between the terminals of the unit 20.

The circuitry of groups 74 and 76 is identical with that described in connection with group 72 except that the basic capacitance units are 100 $\mu\mu f.$ and 10 $\mu\mu f.$ respectively. Each group has its own common bus bar 84 and conductor rod 40 bearing a contact block 38. It will be noted that the four elements of any one group have capacitance values in a 1:2:4:7 proportion. It should be particularly noted that only four capacitors are used in each of the groups 74 and 76. In group 72, the "7" valued capacitor is made up of two parallel-connected capacitors of 3000 $\mu\mu f.$ and 4000 $\mu\mu f.$ in order to conserve space.

By connecting the three conductor rods 40 to their common bus 62 and the bus bar connectors 84 to their common printed circuit bus bar 78, it will be seen that the various capacitors can be connected in parallel so as to provide a capacitance range from a low value of 10 units ($\mu\mu f.$ in this illustration) to a maximum value of 9990 units, in steps of 10 $\mu\mu f.$ It will be noted that the capacitors which have values proportional to basic unit values of 1000 $\mu\mu f.$, 100 $\mu\mu f.$, and 10 $\mu\mu f.$ are connected in the three groups 72, 74, and 76 in the order named, commencing from the left side of the indicator plate 28 to the right side thereof. With this arrangement, the total capacitance value may be read directly by reading the digits indicated by the contact blocks 38 from left to right.

Figure 9:
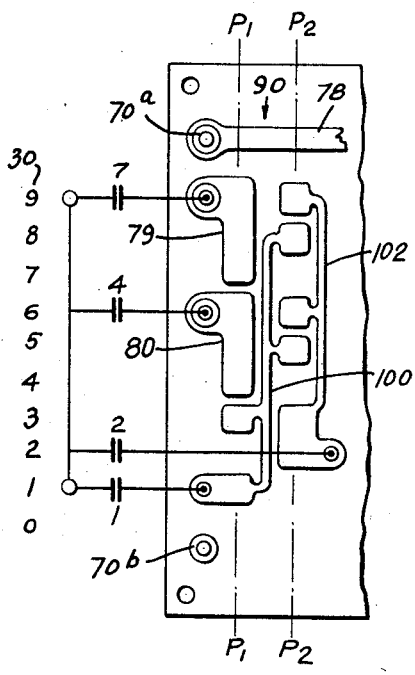
Fig. 9 is a fragmentary plan view of another printed circuit layout.
Figure 10:
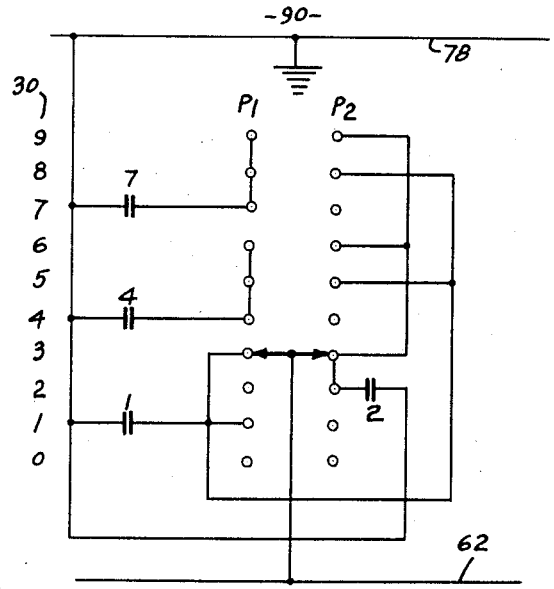
Fig. 10 is a schematic wiring diagram of the printed circuitry shown in Fig. 9.

There are a large number of ways of arranging the contacts and the strips of the printed circuit without departing from the principles of my invention. One such modification is indicated in Figs. 9 and 10. In this embodiment of the invention, the strips 79 and 80 at positions P1–4, P1–5, P1–6, P1–7, P1–8, and P1–9 remain unchanged. However, a strip 100 is provided to connect four contacts which are located respectively at positions P1–1, P1–3, P2–5, and P2–8, and a second strip 102 is employed to provide connections between contacts located at positions P2–3, P2–6, and P2–9. No contacts are located at positions P1–0, P1–2, P2–0, P2–1, P2–4, or P2–7.

Broadly speaking, to provide a decade capacitor, the contacts on the contact plate 24 are arranged in accordance with the following rules:

(1) No contact is located at either 0 position.

(2) A contact is located at one of the 1 positions, but none at the other 1 position.

(3) A contact is located at one of the 2 positions.

(4) A contact is located at each 3 position.

(5) A contact is located at one of the 4 positions, but none at the other 4 position.

(6) A contact is located at each 5 position.

(7) A contact is located at each 6 position.

(8) A contact is located at one of the 7 positions, but none at the other 7 position.

(9) A contact is located at each 8 position.

(10) A contact is located at each 9 position.

(11) A "1-unit" capacitor is connected to the contact that is located at the 1 position, to one of the contacts that is at a 3 position, to one of the contacts at a 5 position, and to one of the contacts at an 8 position.

(12) A "2-unit" capacitor is connected to the contact that is located at the 2 position, to the contact at the other 3 position, to a contact at a 6 position, and to a contact located at a 9 position.

(13) A "4-unit" capacitor is connected to the contact that is at a 4 position, to the contact that is at the remaining 5 position, and to the contact that is at the remaining 6 position.

(14) A "7-unit" capacitor is connected to the contact that is at a 7 position and to the contacts that are at the remaining 8 and 9 positions.

In all such arrangements, the connector leads may be printed without cross-over on the same side of the contact plate. Considering a particular 1 position as chosen in advance, there are $2^8$ or 256 ways of selecting the other contacts and printing them with connectors on one side of a contact plate without cross-over.

The printed circuits utilized in my invention are similar to those now generally used in the art where conductive circuits are photoengraved, etched, or otherwise applied as coated conductors on an insulating base sheet.

In the foregoing description of my invention, the application of the invention to a decade capacitor has been described in detail. In this case, the capacitors have had capacitance values in the proportion 1:2:4:7. Even though the most important application of the invention lies in the field of decade capacitors, it will be understood that the invention may also be employed where the admittance elements are not capacitors, but resistance elements or are inductance elements. When applied with resistance elements, these elements are employed in terms of their conductance values. In such a case, the resistance values of the resistance elements would be in the ratios: 1:1/2:1/4:1/7, thus establishing conductance values in the proportions 1:2:4:7. In such a case, the conductance values would be added in parallel or otherwise connected to provide a conductance between the terminals of the admittance unit in the proportions 0, 1, 2, 3, 4, 5, 6, 7, 8, and 9. Where the invention is applied to inductance elements the admittance element values of these elements should be in terms of reciprocal henries which are in the proportions 1, 2, 4, and 7. In other words, in this case, the inductance values of the inductances would be in the proportions 1:1/2:1/4:1/7. In this case, too, the admittance provided across the terminals of the admittance unit has values proportional to 0, 1, 2, 3, 4, 5, 6, 7, 8, and 9.

Furthermore the invention is not limited to the use of a single type of admittance element at a time. Thus, each admittance element may comprise two or more admittance elements of different kinds. For example, the admittance element connected to the "1" terminal may comprise either a series or parallel network consisting of a resistor and a capacitor or of a resistor and an inductor. In any event, by selecting the other admittance elements which are composed of similar pairs, but are of such values that the four admittance elements have admittance element values in the proportions 1, 2, 4, and 7, the admittance unit provides a sequence of ten values of admittance separated by uniform integral steps. In any case, the same switching unit can be employed to provide a decade admittance unit without connecting more than two independent admittance elements into the circuit at any one time.

It is thus seen that, while only a decade capacitor and only two arrangements of printed circuits have been described in detail, it will now be obvious to those skilled in the art that many changes may be made in the selection of admittance elements, in the form of the admittance unit, in the various details of construction, in the materials, in the sizes and proportions of the parts, and in the arrangement of the printed circuits without departing from the principles of my invention as defined by the appended claims.

I claim:

1. In a multiple-valued admittance unit having a pair of terminals, a movable bridging connector having only two connected contacts disposed normally to the direction of movement of said bridging connector; means connecting said bridging connector to one of said terminals; means for selectively positioning said bridging connector in one of a plurality of connective positions; a contact plate bearing stationary contacts on one side thereof, said stationary contacts being disposed in two parallel paths and adapted to be contacted in turn by the contacts on said bridging connector no more than one contact in each parallel path being contacted at any one time by the corresponding contact of the bridging connector; a group of at least three admittance elements supported on the other side of said contact plate, said admittance elements having a common connection connected to the other of said terminals; means connecting said admittance elements to certain of said stationary contacts; and connectors connecting said certain stationary contacts with the remainder of said stationary contacts, said connectors lying on said one side of said contact plate in non-crossing relationship to each other and said stationary contacts.

2. In a multiple-valued admittance unit having a pair of terminals, a movable bridging connector having two connected contacts disposed normally to the direction of movement of said bridging connector; means connecting said bridging connector to one of said terminals; means for selectively positioning said bridging connector in one of ten consecutive positions numbered from 0 to 9 inclusive; a contact plate bearing stationary contacts on one side thereof, said stationary contacts being disposed in two parallel paths and adapted to be contacted in turn by said contacts on said bridging connector no more than one contact in each parallel path being contacted at any one time by the corresponding contact of the bridging connector; four admittance elements supported on the other side of said contact plate, said admittance elements having a common connection connected to the other of said terminals, the admittances of said admittance elements being in the proportions 1, 2, 4, and 7; means connecting said admittance elements to certain of said stationary contacts; and connectors connecting said certain stationary contacts with other of said stationary contacts, said connectors lying on said one side of said contact plate in non-crossing relationship to each other and said stationary contacts, the connections being such that, as said bridging connector is successively positioned at said ten positions, no more than two admittance elements are connected at any one time between said terminals and the admittance between said terminals changes from 0 to 9 in uniform unit steps.

3. An admittance unit as defined in claim 2 in which all of said connectors and said stationary contacts are printed on one side of said contact plate.

4. In a multiple-valued admittance unit for connecting between two terminals selected values of admittances that are integral values of a unit value: a base member; a pair of movable contacts; means for moving said contacts in unison along a pair of parallel paths on said base member, whereby the contacts are simultaneously located at any one time at corresponding consecutive positions on the two paths, the positions on each path being designated in order by the numbers 0, 1, 2, 3, 4, 5, 6, 7, 8, and 9, corresponding positions on the two paths being designated by the same number, the 0 position of each of the two paths having no connected contact thereat; a first set of four interconnected stationary contacts, said four contacts being located respectively at a 1 position, a 3 position, a 5 position, and an 8 position; a second set of four interconnected stationary contacts located respectively at one of the 2 positions, at the other 3 positions, at a 6 position and at a 9 position; a third set of interconnected stationary contacts located respectively at one of the 4 positions and at the remaining 5 and 6 positions; a fourth set of interconnected contacts located respectively at one of the 7 positions and at the remaining 8 and 9 positions; no connected contact being located at the remaining 1, 2, 4, and 7 positions; first admittance means having an admittance value of one unit having one end connected to said first set of interconnected contacts; second admittance means having an admittance value of two units having one end connected to said second set of interconnected contacts; third admittance means having an admittance value of four units having one end connected to said third set of interconnected contacts; fourth admittance means having an admittance value of seven units having one end connected to said fourth set of interconnected contacts; means for connecting the remaining ends of said admittance elements to one of said terminals; and means for connecting said two movable contacts to the other of said terminals.

5. In a multiple-valued admittance unit for connecting between two terminals selected values of admittances that are integral values of a unit value: a printed circuit contact plate; a pair of movable contacts; means for moving said contacts in unison along a pair of parallel paths on said contact plate, whereby the contacts are simultaneously located at any one time at corresponding consecutive positions on the two paths, the positions on each path being designated in order by the numbers 0, 1, 2, 3, 4, 5, 6, 7, 8, and 9, corresponding positions on the two paths being designated by the same number, the 0 position of each of the two paths having no connected contact thereat; a first set of four interconnected stationary contacts, said four contacts being located respectively at a 1 position, a 3 position, a 5 position, and an 8 position; a second set of four interconnected stationary contacts located respectively at one of the 2 positions, at the other 3 position, at a 6 position, and at a 9 position; a third set of three interconnected stationary contacts located respectively at one of the 4 positions and at the remaining 5 and 6 positions; a fourth set of interconnected contacts located respectively at one of the 7 positions and at the remaining 8 and 9 positions; no connected contact being located at the remaining 1, 2, 4, and 7 positions; the contacts of all sets and the interconnections therebetween being formed by conductor strips all printed on the same side of said contact plate; first admittance means having an admittance value of one unit having one end connected to said first set of interconnected contacts; second admittance means having an admittance value of two units having one end connected to said second set of interconnected contacts; third admittance means having an admittance value of four units having one end connected to said third set of interconnected contacts; fourth admittance means having an admittance value of seven units having one end connected to said fourth set of interconnected contacts; means for connecting the remaining ends of said admittance elements to one of said terminals; and means for connecting said two movable contacts to the other of said terminals.

6. In a selector switch: a base member; a pair of movable contacts; means for moving said contacts in unison along a pair of parallel paths on said base member, whereby the contacts are simultaneously located at any one time at corresponding consecutive positions on the two paths, the positions on each path being designated in order by the numbers 0, 1, 2, 3, 4, 5, 6, 7, 8, and 9, corresponding positions on the two paths being designated by the same number, the 0 position of each of the two paths having no connected contact thereat; a first set of four interconnected stationary contacts, said four contacts being located respectively at a 1 position, a 3 position, a 5 position, and an 8 position; a second set of four interconnected stationary contacts located respectively at one of the 2 positions, at the other 3 position, at a 6 position, and at a 9 position; a third set of interconnected stationary contacts located respectively at one of the 4 positions and at the remaining 5 and 6 positions; and a fourth set of interconnected contacts located respectively at one of the 7 positions and at the remaining 8 and 9 positions; no connected contact being located at the remaining 1, 2, 4, and 7 positions.

7. In a selector switch: a printed circuit contact plate; a pair of movable contacts; means for moving said contacts in unison along a pair of parallel paths on said contact plate, whereby the contacts are simultaneously located at any one time at corresponding consecutive positions on the two paths, the positions on each path being designated in order by the numbers 0, 1, 2, 3, 4, 5, 6, 7, 8, and 9, corresponding positions on the two paths being designated by the same number, the 0 position of each of the two paths having no connected contact thereat; a first set of four interconnected stationary contacts, said four contacts being located respectively at a 1 position, a 3 position, a 5 position and an 8 position; a second set of four interconnected stationary contacts located respectively at one of the 2 positions, at the other 3 position, at a 6 position, and at a 9 position; a third set of three interconnected stationary contacts located respectively at one of the 4 positions and at the remaining 5 and 6 positions; and a fourth set of interconnected contacts located respectively at one of the 7 positions and at the remaining 8 and 9 positions; no connected contact being located at the remaining 1, 2, 4, and 7 positions; the contacts of all sets and the interconnections therebetween being formed by conductor strips all printed on the same side of said contact plate.

References Cited in the file of this patent
UNITED STATES PATENTS

| | | |
|---|---|---|
| 1,245,467 | Kingsbury | Nov. 6, 1917 |
| 1,251,440 | Sultzer | Dec. 25, 1917 |
| 1,350,279 | Howe | Aug. 17, 1920 |
| 2,100,657 | Edwards | Nov. 30, 1937 |
| 2,796,473 | Davis | June 18, 1957 |